US009535689B2

United States Patent
Blitzstein

(10) Patent No.: US 9,535,689 B2
(45) Date of Patent: Jan. 3, 2017

(54) SOURCE CONTROL MANAGEMENT SYSTEM WITH CONTINGENT DEPENDENCY HANDLING

(71) Applicant: PAYPAL, INC., San Jose, CA (US)

(72) Inventor: Jared Blitzstein, Royersford, PA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 14/587,463

(22) Filed: Dec. 31, 2014

(65) Prior Publication Data

US 2016/0188325 A1 Jun. 30, 2016

(51) Int. Cl.
*G06F 9/44* (2006.01)
*H04L 29/06* (2006.01)

(52) U.S. Cl.
CPC ............... *G06F 8/71* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 8,037,453 B1 | 10/2011 | Zawadzki | |
| 8,533,668 B2* | 9/2013 | De Oliveira Costa | G06F 8/75 717/110 |
| 2005/0246687 A1* | 11/2005 | Scott | G06F 8/71 717/122 |
| 2007/0106708 A1* | 5/2007 | Rigg | G06F 8/71 |
| 2007/0283321 A1* | 12/2007 | Hegde | G06F 8/71 717/110 |
| 2012/0036497 A1* | 2/2012 | Karthik | G06F 8/71 717/122 |
| 2012/0324417 A1 | 12/2012 | Somani et al. | |
| 2013/0152047 A1 | 6/2013 | Moorthi et al. | |
| 2015/0227363 A1* | 8/2015 | Pillgram-Larsen | G06F 11/3664 717/122 |

FOREIGN PATENT DOCUMENTS

| | | |
|---|---|---|
| JP | 2009/237654 | 10/2009 |
| JP | 2014/010699 | 1/2014 |

\* cited by examiner

*Primary Examiner* — Lewis A Bullock, Jr.
*Assistant Examiner* — Bruce S Ashley
(74) *Attorney, Agent, or Firm* — Haynes and Boone, LLP

(57) ABSTRACT

Systems and methods for managing dependencies in a source control management system or revision control system are provided. A request to commit a first modified component of a software application may be received. The software application may include a plurality of components. In response to the request to commit the first modified component, a blocking condition may be identified. The blocking condition may be a dependency of the first modified component, in that the first modified component depends upon a second component of the software application. The second component may not satisfy the dependency. A request to commit a modified version of the second component may be received. A determination may be made that the modified version of the second component satisfies the dependency of the first modified component upon the second component. The first modified component and second modified component may then be committed.

20 Claims, 5 Drawing Sheets

SOURCE CONTROL MANAGEMENT SYSTEM WITH CONTINGENT DEPENDENCY HANDLING

BACKGROUND

Field of the Invention

The present disclosure generally relates to computer programming source control management systems and distributed development systems for software applications.

Related Art

Modern software development is often performed by groups of two or more developers, each of whom develop and work on separate portions of a particular software application to be developed. One developer may modify a portion of the software application being developed, such as a specific file of the software application being developed, while another developer simultaneously modifies another file of the software application. Software development is often facilitated by a source control management system, which assists in ensuring that two developers do not modify the same piece of code at the same time.

Some source control management systems can be understood using a tree analogy, in which the in-production, or most current, version of code in a code base is referred to as the "trunk." A developer may check out and modify a portion of the code in a "branch," and once the development is complete on the branch, the branch is merged back into the trunk. Complications arise, however, when a modified portion of the code in a branch depends on another portion of code that does not yet satisfy those dependencies, or when the modified portion of the code depends on other conditions outside of the control of a developer. In such a situation, checking in the modified code may cause instability or other issues in the code base.

Thus, there is a need for an improved method and system for managing dependencies in a source control management system.

Figure 1:
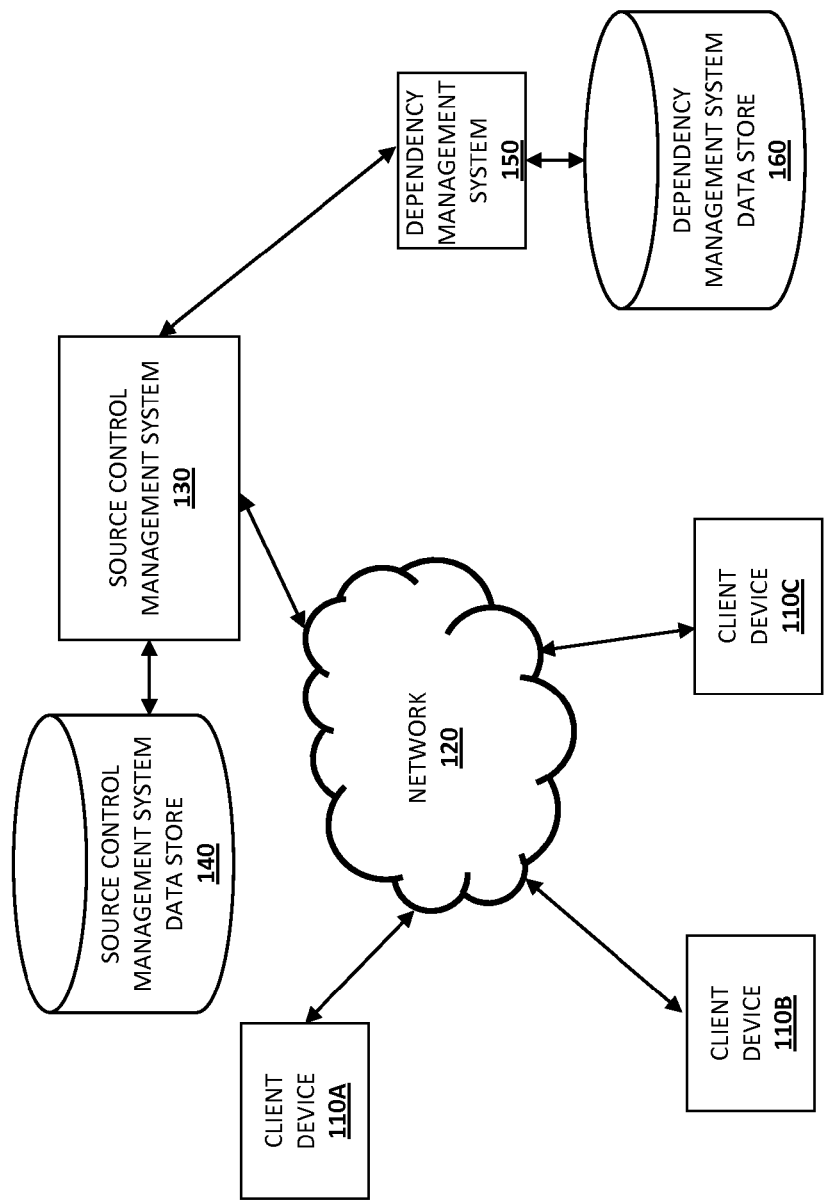
FIG. 1 is a schematic view illustrating an embodiment of a networked system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for managing dependencies in a source control management system or revision control system. A request to commit a first modified component of a software application may be received. The software application may comprise a plurality of components. In response to the request to commit the first modified component, a blocking condition may be identified. The blocking condition may be a dependency of the first modified component, in that the first modified component depends upon a second component of the software application. The second component may not satisfy the dependency. A request to commit a modified version of the second component may be received. A determination may be made that the modified version of the second component satisfies the dependency of the first modified component upon the second component. The first modified component and second modified component may then be committed.

Referring now to FIG. 1, an embodiment of a networked system 100 is illustrated. The networked system 100 includes one or more client devices 110a-110c that are coupled to a network 120. Each client device 110a-110c may be a computing device used by a software developer in a distributed software development environment in which multiple software developers collaboratively contribute to the development of a software application. A source control management system 130 is also coupled to network 120 and a source control management system data store 140. Source control management system 130 may also be coupled to a dependency management system 150. In some embodiments, dependency management system 150 may be coupled directly to network 120, or may be coupled to network 120 through source control management system 130 as shown. Dependency management system 150 may also be coupled to a dependency management system data store 160.

The client devices, source control management system, and dependency management system may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 100, and/or accessible over the network 120.

The client devices 110 may be implemented using any appropriate combination of hardware and/or software configured for wired and/or wireless communication over network 120. For example, in one embodiment, the client devices 110 may be implemented as a personal computer of a user in communication with the Internet. In other embodiments, the client devices 110 may be smart phones, laptop computers, wearable computing devices, and/or other types of computing devices.

The client devices 110 may include one or more browser applications which may be used, for example, to provide a convenient interface to permit users to browse information available over the network 120. For example, in one embodiment, the browser application may be implemented as a web browser configured to view information available over the Internet.

The client devices 110 may also include one or more toolbar applications which may be used, for example, to provide user-side processing for performing desired tasks in response to operations selected by the user. In one embodiment, the toolbar application may display a user interface in connection with the browser application. The client devices 110 may further include other applications as may be desired in particular embodiments to provide desired features to the client devices 110. The other applications may include security applications for implementing user-side security features, programmatic user applications for interfacing with appropriate application programming interfaces (APIs) over the network 120, or other types of applications. Email and/or text applications may also be included, which allow the user to send and receive emails and/or text messages through the network 120. The client devices 110 include one or more user and/or device identifiers which may be implemented, for example, as operating system registry entries, cookies associated with the browser application, identifiers associated with hardware of the client devices 110, or other appropriate identifiers, such as a phone number.

The network 120 may be implemented as a single network or a combination of multiple networks. For example, in various embodiments, the network 120 may include the Internet and/or one or more intranets, landline networks, local area networks, wide area networks, wireless networks, and/or other appropriate types of networks.

Source control management system 130 may manage source code for software applications under development by one or more developers working collaboratively on those software applications. Source control management system 130 may receive requests from developers to check out individual components of a software application under development, maintain records of checked-out components, and may also receive requests from developers to check in those components, once a developer has modified or otherwise completed some work on an individual component. Source control management system 130 may also track multiple versions of a software application under development or individual components of the software application under development, and provide a facility to roll back a software application or component to an earlier version. Source control management system data store 140 may be utilized by source control management system 130 to store software applications under development and constituent components of those software applications.

Dependency management system 150 may track dependencies of one or more components of software applications under development managed by source control management system 130. For example, as described herein, dependency management system may determine whether a modified component of a software application depends on another component of the same software application, and may prevent the modified component from being checked in until the dependency is satisfied. Dependency management system data store 160 may be utilized by dependency management system 150 to store data relating to dependencies of the one or more components of the software applications for which dependencies are managed. Further, dependency management system data store 160 may temporarily store one or more components of a software application under development which cannot be committed due to dependencies, as will be described further herein.

As stated above, modern software development is frequently performed by multiple developers at the same time, each of whom individually work on different portions of a software application under development at any given time. After one developer has completed work on a particular portion of the software application and tested that the portion works, the developer can make the newly developed portion of the application available to other developers, and available to be used (for example, in a production environment), by checking in or committing the portion of software application. However, at any given time, the portion of the software application may be prevented from committing the code due to various dependencies. For example, the developer may have to request that other parties make changes to other portions of the software application, or make changes to infrastructure resources, before the developer's modified code can be used. In such a situation, the developer must wait until all dependencies are met, and only then can the developer commit the code to make it available. Complications arise in such situations; for example, the developer may have to repeatedly check on an hourly or daily basis to determine if the dependencies are met, and only then can the developer commit the code. If a long period of time elapses, the developer may forget to commit the code. If the developer ignores the dependencies and commits the code, other developers' activities may be interrupted due to the new portions of code.

Embodiments described herein track such dependencies and allow a developer to conditionally commit modified components of a software application, even if those modified components have dependencies that, at the time of the commit request, are unsatisfied. Once any dependencies of the modified components are satisfied, a source control management system or dependency management system may commit the modified components, so that the modified components can be made available to other developers and to any systems utilizing such code, without further development involvement.

Figure 2:
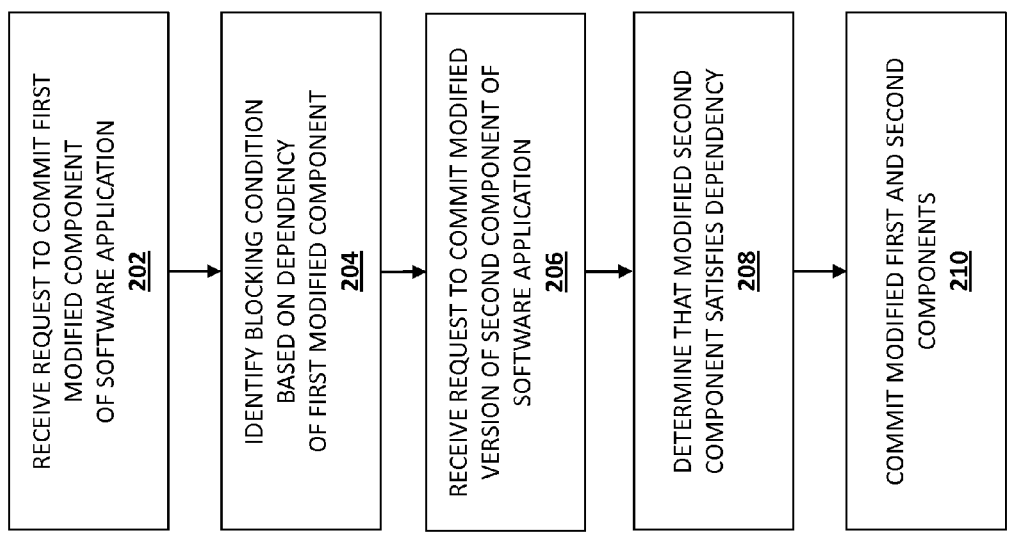
FIG. 2 is a flow chart illustrating an embodiment of a method for managing dependencies in a source control management system.

Referring now to FIG. 2, an embodiment of a method 200 for managing dependencies in a source control system or source code management system is described. In the embodiments and examples discussed below, a money sending application is used as an example of an application under development. However, other applications under development are also possible, including payment applications, such as checkout applications, donate money to charity applications, and/or a wide variety of other types of payment applications known in the art. Furthermore, as discussed above, a wide variety of non-payment applications will benefit from the teachings of the present disclosure and are envisioned as falling within its scope. Such applications may be provided by a payment provider service or other system provider.

The method 200 begins at block 202 where a request to commit a first modified component of a software application is received. In one embodiment, the software application includes multiple components. As used herein, a component or software component may refer to an individual source code file in a software application, a package in a software application, a collection of source code files, header files, a folder of source code files, a branch of code in a software application, or any other discrete portion of a software application. In one embodiment, the request to commit the first modified component occurs after a developer, programmer, or other user has received the first component by checking the component out, performed some modification to the component, and then requested a commit of the first modified component. For example, a developer may transmit a request to commit a file named "send_money.html" which depends on a second file called "get_account.js." In this example, the developer may have added code to the "send_money.html" file which calls a function "accountName" which is to be added to the "get_account.js" file (e.g., by another developer), but which does not yet exist in that file.

The method 200 then continues to block 204, where, in response to receiving the request to commit the first modified component, a blocking condition is identified. In one embodiment, the blocking condition is a dependency of the first modified component. In one embodiment, the dependency may be that the first modified component depends upon a second component of the software application that presently does not satisfy the dependency. For example, the first modified component may reference a method or operation that is presently under development for the second component, but is not yet available. In one embodiment, the first modified component may depend on a particular version of a particular application programming interface (API) being developed. In one embodiment, the blocking condition may be identified for a branch of a software application which includes the first modified component, and not only the first modified component itself. In one embodiment, other dependencies may cause a blocking condition to be identified. For example, in one embodiment, a modified component may depend on the availability or existence of a particular infrastructure resource, such as a server, server pool, database, networking equipment, or other resource. In one embodiment, the dependency may be an approval from a supervisory developer or other party. In one embodiment, the blocking condition may be the existence of a code freeze. For example, a code freeze may occur during a period of time when a particular application requires high availability, and any changes to the application are blocked to ensure that high availability. In the example mentioned with reference to block 202, the blocking condition is a dependency upon the "get_account.js" file.

In one embodiment, the blocking condition or dependency is identified based upon an instruction contained within the commit request. For example, a developer may, upon requesting a commit, instruct or otherwise inform a source code management system or dependency management system that the modified component, or a branch including the modified component, has one or more dependencies, whether those dependencies are upon other components, infrastructure resources, approvals, or other conditions. Based on such an instruction, a source code management system or dependency management system may identify the blocking condition. In one embodiment, the blocking condition or dependency is identified based upon an analysis of the modified component or the branch which includes the modified component. For example, the source code management system may examine the changes in the modified component, and determine whether the modified component references, requires, or depends on another component. The source code management system may identify a name or other identifier for the depended-upon component, and may further analyze the other component and determine whether the depended-upon component satisfies the particular dependency. If the dependency is not satisfied, a blocking condition is identified. In one embodiment, based on the blocking condition, the first modified component, or the branch which includes the first modified component, is stored in a temporary repository. In one embodiment, if the first modified component or branch is stored in a temporary repository, a message is transmitted to the user requesting the commit of the first modified component.

The method 200 then continues to block 206, where a request to commit a modified version of the second component of the software project is received. In one embodiment, as with the first component, the request to commit the second modified component occurs after a developer, programmer, or other user has received the second component by checking the component out, performing some modification to the second component, and requesting a commit of the second modified component. In one embodiment, requests to commit modified versions of the second component are monitored by, for example, a source control management system or dependency management system. In the example described with reference to blocks 202 and 204, a request to commit the "get_account.js" file may be received.

The method 200 then continues to block 208, where, in response to the request to commit the modified version of the second component, the modified version of the second component is determined to satisfy the dependency of the first modified component. For example, as described above, the modified version of the second component may include the method referenced by the first modified component, or may be part of the required API being developed. In one embodiment, if the dependency is not upon a component of a software application, and is instead a dependency upon, for example, a resource, the determination at block 208 may be a determination that the dependency is satisfied by the resource. For example, the determination at block 208 may occur as a result of a notification that a particular server or other infrastructure resource has become available. In one embodiment, the determination may be based upon an analysis of one or more lines of code within the second modified component. In one embodiment, the determination may be based upon an instruction within the request to commit the second modified component. In the example described with reference to blocks 202, 204, and 206, the source code management system or dependency management system may determine that the "accountName" function does not yet exist within the "get_account.js" file.

The method 200 then continues to block 210, where, based on the determination that the modified version of the second component satisfies the dependency of the first modified component upon the second component, the first modified component and second modified component are committed to a repository. In one embodiment, the first modified component may be retrieved from a temporary repository (such as the dependency management system data store) and committed, or checked-in, to the primary source control management system repository or data store. In one embodiment, upon committing the first modified component, the user who initially transmitted the request to commit the first modified component may be notified, via message or other notification, that the first modified component is now committed and available. Thus, in the example described with reference to blocks 202, 204, 206, and 208, the "send_money.html" and "get_account.js" files may be committed to the source control management system data store.

Figure 3A:
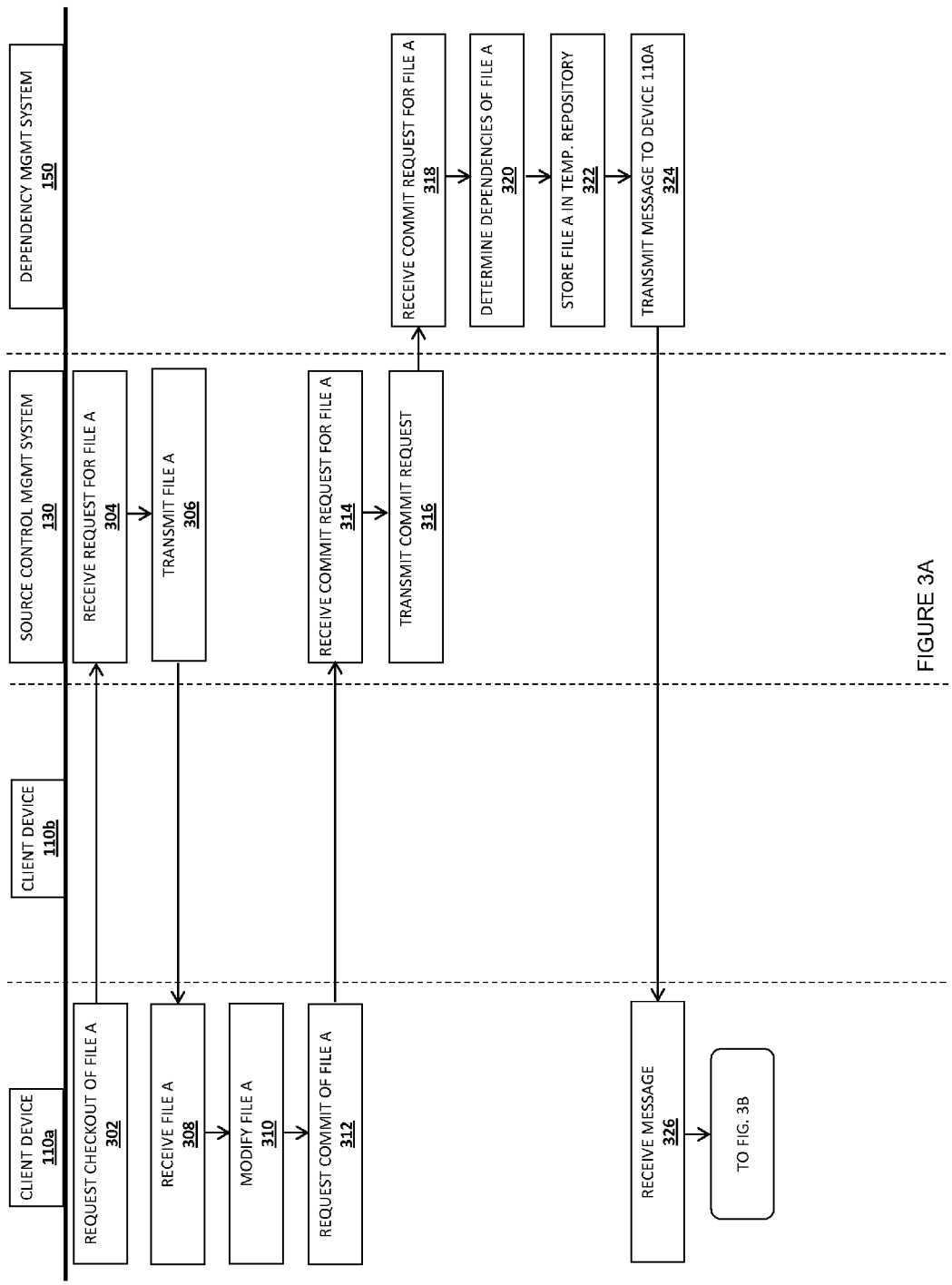
FIGS. 3a-3b are swim lane diagrams illustrating an example of managing dependencies in a source control management system.
Figure 3B:
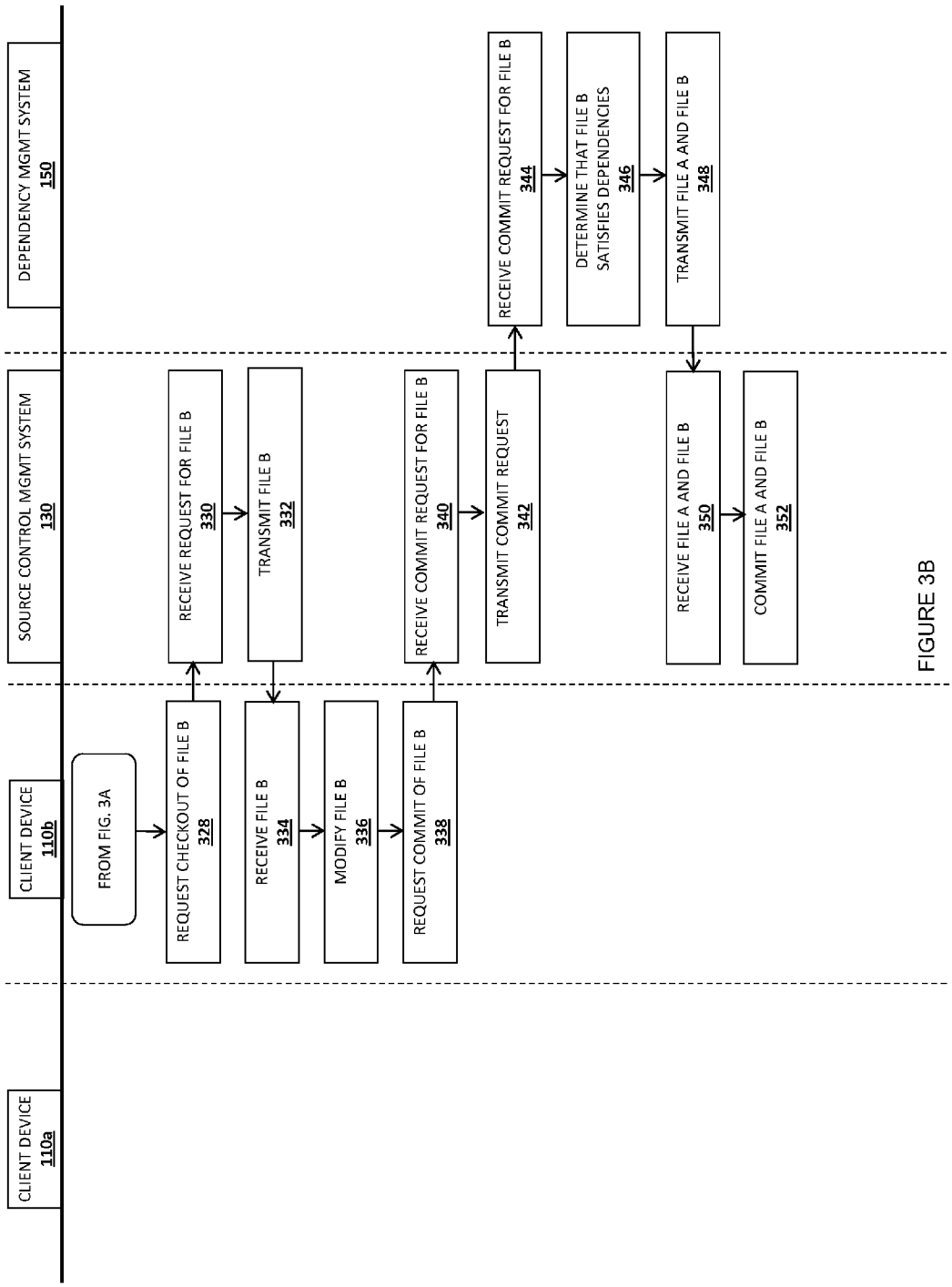

Referring now to FIGS. 3A-3B, a swim lane diagram (which begins at FIG. 3A and continues to FIG. 3B) detailing the interaction between various systems and components described with reference to embodiments discussed above is illustrated. The example of FIGS. 3A-3B illustrates the interactions between client devices 110*a* and 110*b*, source control management system 130, and dependency management system 150.

Beginning on FIG. 3A, at event 302, a developer using client device 110*a* may request a checkout of a particular component of a software application (herein referred to as "file A"). At event 304, source control management system 130 receives the checkout request, and at event 306, transmits the file to client device 110*a*. At event 308, client device 110*a* receives the file.

At event 310, the developer using client device 110*a* may modify file A, and may introduce dependencies into the code of file A. For example, as described above, the developer may modify file A to call a method to be included in another file of the software application. At event 312, the developer using client device 110*a* may transmit a request to commit the modified file A to the source control management system 130. At event 314, source control management system 130 receives the request. In one embodiment, the commit request may be transmitted to dependency management system 150, which may identify and keep track of dependencies.

Thus, at event 316, source control management system 130 transmits the commit request to dependency management system 150. At event 318, dependency management system 150 receives the request, and at event 320, determines whether any dependencies exist in the modified file A. As detailed above, dependency management system may analyze file A to determine whether the developer introduced any dependencies, or in one embodiment, the developer may identify any dependencies in the request to commit the modified file A. In one embodiment, dependency management system 150 is incorporated into, and is part of, source control management system 130; in this embodiment, transmitting the commit request to dependency management system 150 may not be necessary.

At event 322 then, based on the dependency identified at event 320, dependency management system 150 may store the modified file A in a temporary repository, such as dependency management system data store 160, in one embodiment. In one embodiment, at event 324, dependency management system 150 transmits a message to client device 110*a* informing the developer using client device 110*a* of the dependency and the temporary storage, which is received by client device 110*a* at event 326.

Continuing to FIG. 3B, at event 328, a developer using client device 110*b* may request a check out of file B, and transmit a check out request to source control management system 130. At event 330, source control management system 130 may receive the request to check out file B, and at event 332, may transmit file B to client device 110*b*. At event 334, client device 110*b* may receive file B.

At event 336, the developer using client device 110*b* may modify file B, which causes file B to satisfy the dependencies of the modified file A. For example, the developer using client device 110*b* may add the method which is called by the modified file A. At event 338, the developer using client device 110*b* may transmit a request to commit the modified file B to the source control management system 130. At event 340, source control management system 130 receives the request, and as described above, in one embodiment, the commit request may be transmitted at event 342 to dependency management system 150, which may identify and keep track of dependencies. At event 344, dependency management system 150 may receive the check in request, and at event 346, dependency management system 150 may determine that file B has no dependencies of its own, and also, that file B satisfies the dependencies of file A (currently stored in the dependency management system data store 160). In one embodiment, dependency management system 150 analyzes file B to determine that file B satisfies the previously identified dependencies of file A.

Thus, at event 348, dependency management system 150 may transmit file A and file B to source control management system 130. At event 350, source control management system 130 receives file A and file B. At event 352 then, source control management system 130 may commit file A and file B. For example, in one embodiment, source control management system 130 may store file A and file B in source control management system data store 140. The updated files and software application may then be made available to other developers and/or users.

Thus, systems and methods for managing dependencies in a source control management system have been described that permit developers of software applications under development the ability to commit code at any time, without issues or complications which arise from dependencies existing in modified code. The systems and methods of the present disclosure provide substantial benefits over conventional solutions such as the committing of code without checking dependencies by, for example, storing modified code in a temporary repository, rather than introducing dependencies into a code base which are not yet satisfied and which could cause instability in a software application.

Figure 4:
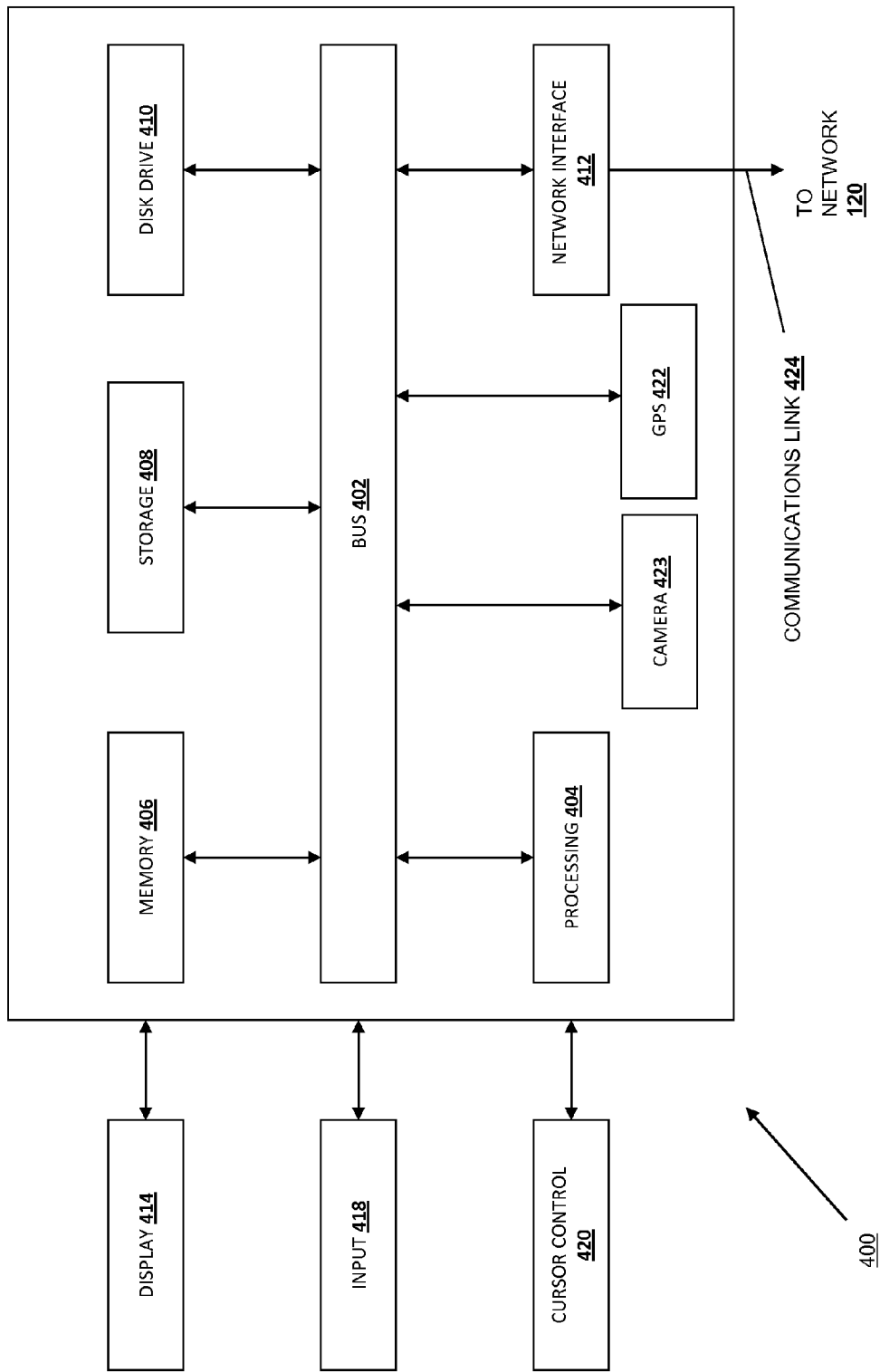
FIG. 4 is a schematic view illustrating an embodiment of a computing device.

Referring now to FIG. 4, an embodiment of a computer system 400 suitable for implementing, for example, the client devices 110*a*-110*c*, source control management system 130, dependency management system 150, source control management system data store 140, and/or dependency management system data store 160, is illustrated. It should be appreciated that other devices utilized by customers, merchants, payment service providers, and/or system providers in the system discussed above may be implemented as the computer system 400 in a manner as follows.

In accordance with various embodiments of the present disclosure, computer system 400, such as a computer and/or a network server, includes a bus 402 or other communication mechanism for communicating information, which interconnects subsystems and components, such as a processing component 404 (e.g., processor, micro-controller, digital signal processor (DSP), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 418 (e.g., keyboard, keypad, or virtual keyboard), a cursor control component 420 (e.g., mouse, pointer, or trackball), a location determination component 422 (e.g., a Global Positioning System (GPS) device as illustrated, a cell tower triangulation device, and/or a variety of other location determination devices known in the art), and/or a camera component 423. In one implementation, the disk drive component 410 may comprise a database having one or more disk drive components.

In accordance with embodiments of the present disclosure, the computer system 400 performs specific operations by the processor 404 executing one or more sequences of instructions contained in the memory component 406, such as described herein with respect to the client devices 110, source control management system 130, source control management system data store 140, dependency management system 150, and/or dependency management system data store 160. Such instructions may be read into the system memory component 406 from another computer readable medium, such as the static storage component 408 or the disk drive component 410. In other embodiments, hardwired circuitry may be used in place of or in combination with software instructions to implement the present disclosure.

Logic may be encoded in a computer readable medium, which may refer to any medium that participates in providing instructions to the processor 404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 410, volatile media includes dynamic memory, such as the system memory component 406, and transmission media includes coaxial cables, copper wire, and fiber optics, including wires that comprise the bus 402.

In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 400. In various other embodiments of the present disclosure, a plurality of the computer systems 400 coupled by a communication link 424 to the network 120 (e.g., such as a LAN, WLAN, PTSN, and/or various other wired or wireless networks, including telecommunications, mobile, and cellular phone networks) may perform instruction sequences to practice the present disclosure in coordination with one another.

The computer system 400 may transmit and receive messages, data, information and instructions, including one or more programs (i.e., application code) through the communication link 424 and the network interface component 412. The network interface component 412 may include an antenna, either separate or integrated, to enable transmission and reception via the communication link 424. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a source control management system comprising a first non-transitory memory and a first one or more hardware processors coupled to the first non-transitory memory; and
   a dependency management system comprising a second non-transitory memory and a second one or more hardware processors coupled to the second non-transitory memory;
   wherein the hardware processors of the source control management system are configured to read instructions from the first non-transitory memory to cause the system to perform operations comprising:
   receiving a request to commit a first modified component of a software application, the software application comprising a plurality of components including at least a first component and a second component;
   transmitting, to the dependency management system, the request to commit the first modified component of the software application;
   subsequently receiving a request to commit a modified version of the second component of the software project;
   transmitting to the dependency management system, the request to commit the modified version of the second component of the software application; and
   based on an approval by the dependency management system, committing the first modified component and the second modified component;
   and wherein the hardware processors of the dependency management system are configured to read instructions from the second non-transitory memory to cause the system to perform operations comprising:
   in response to the request to commit the first modified component, identifying a blocking condition in response to the request to commit the first modified component, wherein the blocking condition is a dependency of the first modified component upon a current version of the second component of the software application, wherein the current version of the second component does not satisfy the dependency;
   in response to identifying the blocking condition, storing, in a temporary repository, the first modified component;
   in response to the request to commit the second modified component, determining that the modified version of the second component satisfies the dependency of the first modified component upon the second component; and
   transmitting, to the source control management system, an approval for committing the first and second modified components.

2. The system of claim 1, wherein identifying the blocking condition based on the request to commit the first modified component further includes:

monitoring multiple requests to commit modified versions of the second component.

3. The system of claim 1, wherein the second operations further comprise:
   determining an identity of a user transmitting the request to commit the first modified component of the software project; and
   transmitting, to the user transmitting the request to commit the first modified component of the software project, an update message upon committing the first modified component and the second modified component.

4. The system of claim 1, wherein identifying a blocking condition in response to the request to commit the first modified component further includes:
   identifying the blocking condition in response to the request to commit the first modified component based upon an instruction contained within the request to commit the first modified component.

5. The system of claim 1, wherein identifying a blocking condition based on the request to commit the first modified component further includes:
   identifying the blocking condition in response to the request to commit the first modified component based upon an analysis of one or more lines of code within the first modified component.

6. The system of claim 5, wherein identifying a blocking condition in response to the request to commit the first modified component based upon an analysis of one or more lines of code within the first modified component further includes identifying a name of the second component of the software project upon which the dependency exists.

7. The system of claim 1, wherein the dependency of the first modified component is a dependency upon a particular application programming interface.

8. A method for managing software components of a software project, comprising:
   receiving, at a source control management system, a request to commit a first modified component of a software application, the software application comprising a plurality of components including at least a first component and a second component;
   transmitting, by the source control management system to a dependency management system, the request to commit the first modified component of the software application;
   identifying, by the dependency management system, a blocking condition, wherein the blocking condition is a dependency of the first modified component upon a current version of the second component of the software application, wherein the current version of the second component does not satisfy the dependency;
   storing, by the dependency management system in a temporary repository, the first modified component;
   subsequently receiving, at the source control management system, a request to commit a modified version of the second component of the software application;
   transmitting, by the source control management system, the request to commit the modified version of the second component of the software application to the dependency management system;
   determining, by the dependency management system, that the modified version of the second component satisfies the dependency of the first modified component upon the second component;
   transmitting, by the dependency management system to the source control management system, an approval for committing the first and second modified components; and
   committing, by the source control management system, the first modified component and the second modified component.

9. The method of claim 8, wherein identifying the blocking condition based on the request to commit the first modified component further comprises:
   monitoring multiple requests to commit modified versions of the second component.

10. The method of claim 8, further comprising:
    determining an identity of a user transmitting the request to commit the first modified component of the software project; and
    transmitting, to the user transmitting the request to commit the first modified component of the software project, an update message upon committing the first modified component and the second modified component.

11. The method of claim 8, wherein identifying a blocking condition in response to the request to commit the first modified component further includes:
    identifying the blocking condition in response to the request to commit the first modified component based upon an instruction contained within the request to commit the first modified component.

12. The method of claim 8, wherein identifying a blocking condition based on the request to commit the first modified component further includes:
    identifying the blocking condition in response to the request to commit the first modified component based upon an analysis of one or more lines of code within the first modified component.

13. The method of claim 12, wherein identifying a blocking condition in response to the request to commit the first modified component based upon an analysis of one or more lines of code within the first modified component further includes identifying a name of the second component of the software project upon which the dependency exists.

14. The method of claim 8, wherein the dependency of the first modified component is a dependency upon a particular application programming interface.

15. A non-transitory machine-readable medium having stored thereon machine-readable instructions executable to cause one or more machines to perform operations comprising:
    receiving, at a source control management system, a request to commit a first modified component of a software application, the software application comprising a plurality of components including at least a first component and a second component;
    transmitting, by the source control management system to a dependency management system, the request to commit the first modified component of the software application;
    identifying, by the dependency management system, a blocking condition, wherein the blocking condition is a dependency of the first modified component upon a current version of the second component of the software application, wherein the current version of the second component does not satisfy the dependency;
    storing, by the dependency management system in a temporary repository, the first modified component;
    subsequently receiving a request to commit a modified version of the second component of the software application;

transmitting, by the source control management system, the request to commit the modified version of the second component of the software application to the dependency management system;

determining, by the dependency management system, that the modified version of the second component satisfies the dependency of the first modified component upon the second component;

transmitting, by the dependency management system to the source control management system, an approval for committing the first and second modified components; and committing, by the source control management system, the first modified component and the second modified component.

16. The non-transitory machine-readable medium of claim 15, wherein the operations further comprise:

monitoring multiple requests to commit modified versions of the second component.

17. The non-transitory machine-readable medium of claim 15, wherein the operations further comprise:

determining an identity of a user transmitting the request to commit the first modified component of the software project; and transmitting, to the user transmitting the request to commit the first modified component of the software project, an update message upon committing the first modified component and the second modified component.

18. The non-transitory machine-readable medium of claim 15, wherein identifying a blocking condition in response to the request to commit the first modified component further includes:

identifying the blocking condition in response to the request to commit the first modified component based upon an instruction contained within the request to commit the first modified component.

19. The non-transitory machine-readable medium of claim 15, wherein identifying a blocking condition based on the request to commit the first modified component further includes:

identifying the blocking condition in response to the request to commit the first modified component based upon an analysis of one or more lines of code within the first modified component.

20. The non-transitory machine-readable medium of claim 19, wherein identifying a blocking condition in response to the request to commit the first modified component based upon an analysis of one or more lines of code within the first modified component further includes identifying a name of the second component of the software project upon which the dependency exists.

* * * * *